Figure 2:
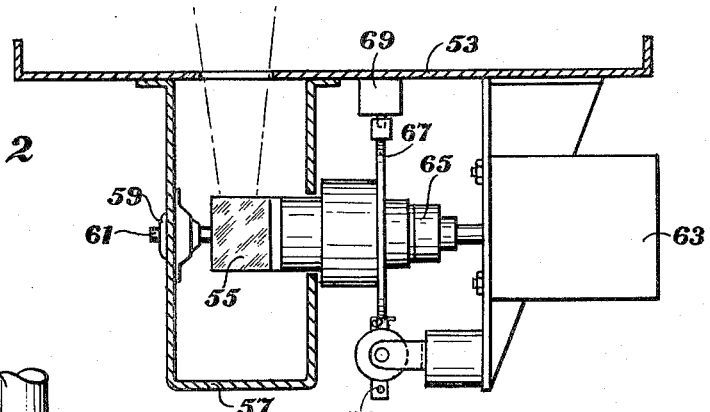

Feb. 16, 1965
R. W. PATTERSON
3,169,465
CONTACT PRINTING APPARATUS
Filed Dec. 15, 1961
2 Sheets-Sheet 1
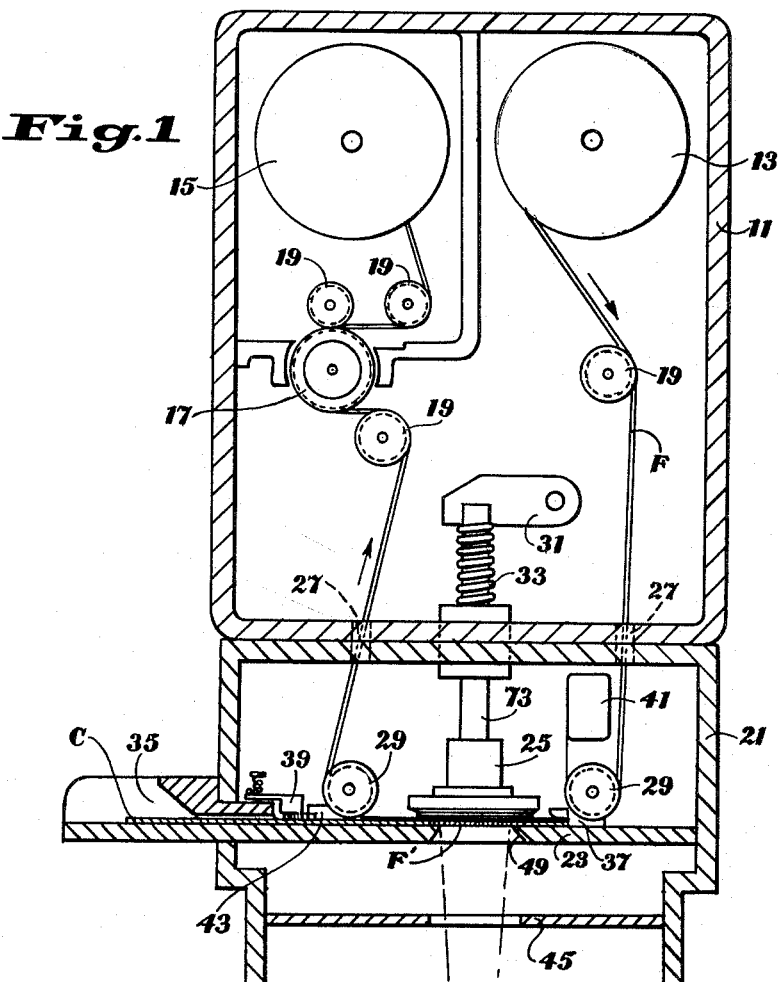
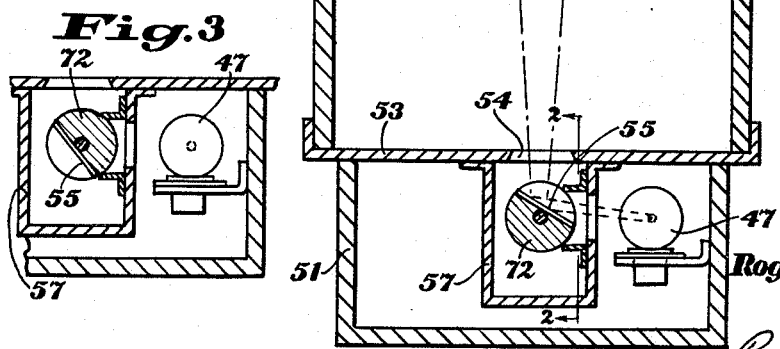
Roger W. Patterson
INVENTOR.
BY R. French Smith
Paul P. Holmes
ATTORNEYS Feb. 16, 1965  R. W. PATTERSON  3,169,465
CONTACT PRINTING APPARATUS
Filed Dec. 15, 1961  2 Sheets-Sheet 2

Roger W. Patterson
INVENTOR.
BY R. Frank Smith
Paul W. Holmes
ATTORNEYS 3,169,465
CONTACT PRINTING APPARATUS
Roger W. Patterson, New York, N.Y., assignor to Eastman Kodak Company, Rochester, N.Y., a corporation of New Jersey
Filed Dec. 15, 1961, Ser. No. 159,550
9 Claims. (Cl. 95—76)

This invention relates to photographic contact printing apparatus and more particularly to a rotating mirror assembly which is capable of scanning the exposure station with light to provide both the timing and the shuttering function and to a novel platen designed to cooperate with such a mirror assembly in a contact printing apparatus.

In the known contact printers the negative is usually positioned between a photo-sensitive print material and a glass plate, through which plate illumination from a lamp is directed during print exposure. That construction has certain disadvantages. In the first place, it is necessary to keep the glass clean; that is, free of dust particles, fingerprints and scratches which will appear in the exposed print. Secondly, the contact between the negative, the print material and the glass may not be uniform (resulting in a fuzzy print) because such contact is obtained by means of springs, rubber pads or other resilient members which press nonuniformly against the print material. In the contact printer of the present invention, a more intimate contact between the print material and negative is secured during exposure. This is obtained by utilizing a vacuum system for holding the image-bearing member, it may or may not be a photographic negative, and the print material in suface contact on the platen. In addition to this function, the vacuum system and platen eliminates the need for a glass plate through which the exposing light must pass. In the contact printer of the present invention a reflector is mounted for rotation about an axis which is parallel to the plane of the platen and is positioned with respect to the exposure lamp so that light from the lamp is moved across the image-bearing member in scanning relation thereto, during print exposure. Means is provided to stop the reflector in a downwardly disposed position so that dust tends not to accumulate on the surface of the reflector and wherein light from the exposure lamp is prevented from reaching the print material. Even if dust should eventually accumulate on the reflector it will not be noticed in the print because of the scanning movement of light in the exposure station during print exposure.

The primary object of the present invention is, therefore, to provide an improved photographic contact printing apparatus.

Another object of the present invention is to provide a contact printing apparatus in which the adverse effects of dirt, dust, and scratches are substantially reduced.

Another object of the present invention is to provide a novel platen and rotating mirror assembly for use in a photographic printing apparatus.

Still another object of the present invention is to provide a contact printing apparatus in which the exposure time is controlled by angular rotation of a mirror which scans the exposure station with light for print exposure.

Yet another object of the present invention is to provide an automatically operating contact printing apparatus in which a print exposure is made and an unexposed section of print material is advanced to the exposure station in response to the positioning of an image-bearing member in the exposure station.

Figure 4:
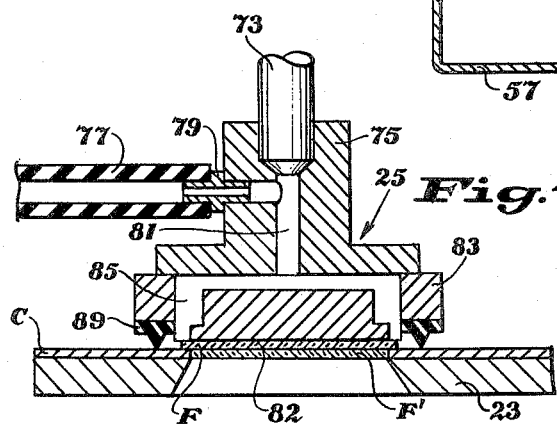
Figure 5:
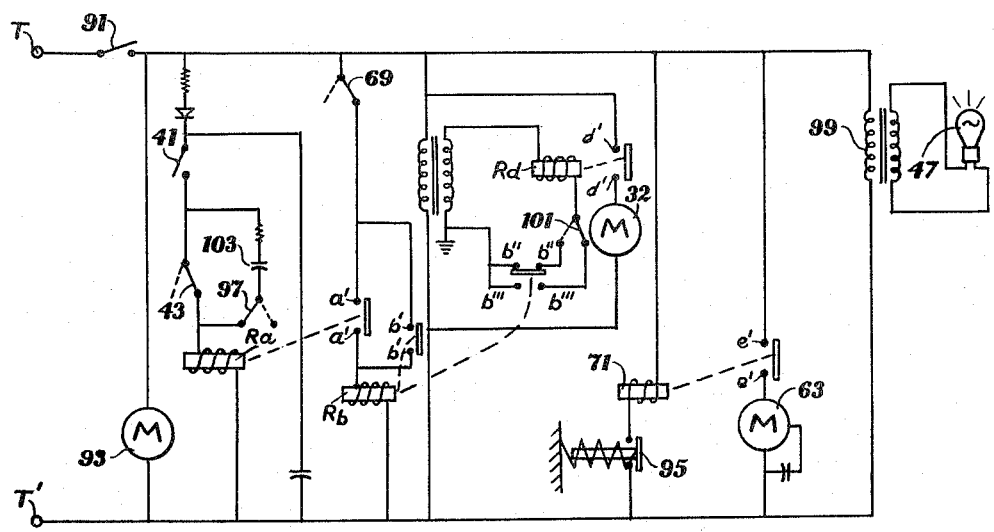

Still other objects and advantages of the present invention will become readily apparent to those skilled in the art from the following description with respect to the drawings in which like characters denote like parts and wherein:

FIG. 1 is a sectional view of the contact printing apparatus of the present invention;
FIG. 2 is an enlarged view of the rotating mirror assembly taken along lines 2—2 of FIG. 1;
FIG. 3 is a view of a part of the rotating mirror assembly showing the mirror in its normal rest position;
FIG. 4 is an enlarged sectional view showing the platen utilized in accordance with the present invention; and
FIG. 5 is a schematic wiring diagram for the apparatus.

In FIG. 1 the numeral 11 designates the housing for the film unit utilized in the contact printer of the present invention. One portion of the interior of housing 11 is accessible through a door, not shown, and within such interior is mounted a supply spool 13 containing a supply of photo-sensitive material, for example, film F, a take-up spool 15 on which the film after exposure is wound, a film drive roller 17 which frictionally engages and moves film F from the supply spool to the take-up spool and a plurality of film guide rollers each designated by the numeral 19. The housing 11 is mounted on pedestal assembly 21. The pedestal assembly includes a card support platform 23, which may be made adjustable, for example, by positioning screws, not shown, to properly position the platform with respect to platen 25. Slots 27 are provide in the housing 11 and pedestal assembly 21 so that film F can pass from the supply spool 13 within housing 11 down into the pedestal assembly 21 and back to the take-up spool 15 in housing 11. Film guide rollers 29 guide film F for movement across the under surface of the platen 25.

The platen 25 is movable between one position slightly above the path of movement of film F and out of contact with the film to a second position in which the undersurface of the platen is in contact with the film. The platen is moved by the pivoting movement of actuating arm 31 which, in turn, is driven by a suitable mechanism including a motor 32 within housing 11. This mechanism is well known in the art and does not form a novel element of the present invention so therefore is not described and is not shown in the drawing. Motor 32 also drives through a gear train, not shown, the film drive roller 17. The spring 33 returns the platen 25 to its raised position when motor 32 stops and releases arm 31.

The card support platform 23 has a throat 35 which is adapted to receive and position an aperture card C in printing relation under platen 25. As known in the art, an aperture card is a paper card having a window in which a film (usually 35 mm. size) bearing a record image is mounted. Stops such as that designated at 37 are positioned on platform 23 to align the film in the aperture card in printing relation to the film F under platen 25. In the drawing, the film in the aperture card is designated by the character F'. A light lock 39 is provided opposite throat 35 so as to prevent light from fogging the photo-sensitive film F in the pedestal assembly 21. The numeral 41 designates a trip switch and 43 an interlock switch, the purpose and operation of which will be explained with reference to FIG. 5 of the drawing. Within pedestal assembly 21 below the card support platform 23 is located aperture baffle plate 45. This, together with other wall means, prevents unwanted stray light from exposure lamp 47 from reaching the exposure station where print exposure occurs and which is, in this apparatus, defined by the aperture 49 in platform 23. Lamp 47 is mounted upright in the lamp housing 51 and a horizontal light beam from the lamp is utilized thereby avoiding the necessity of transmission through the top of the lamp envelope which, as is well known, becomes blackened with use. Lamp housing 51 is separated from the pedestal assembly 21 by a cover plate 53 having an aperture 54 to allow light from the lamp 47 to be directed to the exposure station. A mirror 55 is mounted for rotation within the lamp housing 51 about an axis which is parallel to the plane of film F' in the exposure station and at right angles to the direction of movement of film F under platen 25. A light shield 57 reduces the amount of stray light which might otherwise reach the exposure station.

As illustrated in FIG. 2, the light shield 57 incorporates a bearing 59 for rotatably supporting one end of shaft 61 which is associated with mirror 55. The mirror 55 is driven by means of a synchronous geared motor 63 through a single revolution slip clutch 65. Cam 67 is mounted for rotation with mirror 55 and actuates the mirror switch 69 and the mirror relay 71 as will be hereinafter explained. The single revolution clutch 65 brings the mirror 55 to rest in a position where the reflecting surface of the mirror is directed generally downwardly. This rest position is illustrated in FIG. 3. When so positioned, mirror 55 does not tend to collect "falling" lint or dust, and light from lamp 47 is prevented from leaving lamp housing 51 because the round back support 72 of the mirror mounting effectively closes the opening in the light shield 57 and prevents light from entering the same. The angular velocity with which motor 63 drives mirror 55 determines the exposure period and obviously the choice of gearing to be used between the motor and mirror will depend on the photo-sensitive material, the density of the negatives to be printed and, of course, the intensity of illumination.

The platen structure is better shown in FIG. 4. The platen shaft 73 transmits the motion imparted by the actuating arm 31 to the platen 25 and is fixed on head 75 of the platen. A hose 77 is also connected to head 75 by means of a nipple 79 and to a source of vacuum pressure, not shown, so that the vacuum pressure is applied through bore 81 in the platen to the surface 82 of the platen. The platen base 83 is fixed on head 75 by screws, not shown, and contains passageways 85 which communicate with the bore 81 and the under surface 82 of the platen. The passageways at surface 82 are spaced further than the film F width so the film F does not close the passageways. A rubber gasket 89 is provided around the periphery of base 83 to form a seal between the card C and the platen when the platen is moved down onto the card. Thus, when the platen shaft is moved in a downward direction by the actuating arm 31 the vacuum pressure at surface 82 insures that a uniform intimate contact is obtained between the film F' and the film F on the surface 82 of the platen 25.

Referring to FIG. 5, the numeral 91 designates the main ON-OFF switch for the apparatus. The motor designated by the numeral 93 drives the vacuum pump, not shown, which serves as the source of vacuum pressure for the apparatus. The switch 95 is a vacuum operated switch which is closed when a predetermined vacuum pressure is obtained at the under surface 82 of platen 25. The motor 32 which drives the film drive roller 17 in the film unit is operatively associated with a switch 97 to open and close the same once during each advance of film F. Switch 97 is normally closed as shown in FIG. 4.

The trip relay $R_a$ which is in series with switches 41 and 43 controls the circuit through its contacts $a'$. Similarly cycle hold relay $R_b$ has contacts $b'$, $b''$ and $b'''$, film unit relay $R_d$ has contacts $d'$. The contacts controlled by the mirror solenoid 71 are designated $e'$.

The operational cycle is as follows: Power from an A.C. source, not shown, is applied across the input terminals T, T' and main ON–OFF switch 91 is closed. The exposure light 47 is energized from the transformer 99 and the vacuum pump motor 93 drives the vacuum pump, not shown. As the aperture card C is inserted into the throat 35 on card support platform 23, it first engages and opens interlock switch 43 and when it is fully positioned in the apparatus with the film F' located over the aperture 49 in the exposure station it engages and closes the trip switch 41. The resulting pulse energizes trip relay $R_a$ which closes the circuit through contacts $a'$ to the cycle hold relay $R_b$ and the cycle hold relay closes its contacts $b'$ and is locked in circuit thereby. Contacts $b'''$ are also closed and the film unit relay $R_d$ is energized. The contacts $d'$ of relay $R_d$ are closed and the motor 32 for the film unit is actuated. The motor 32 moves the vacuum platen 25 downwardly onto the film F and card C and the same motor by cam means, not shown, opens platen switch 101 through contacts $b''$ after platen 25 is in contact with card C thereby causing the film unit relay $R_d$ to drop-out and stop the motor 32. Vacuum switch 95 closes when a predetermined vacuum pressure is reached at surface 82 of platen 25 as a result of the sealing contact of gasket 89 on the surface of card C. When switch 95 closes, relay 71 is energized closing contacts $e'$ and energizing the mirror motor 63. Mirror 55 is rotated by the motor 63 one complete revolution during which the light from the lamp 47 is moved across film F' to expose an image on film F. Shortly after the rotation of mirror 55 commences, the mirror cam switch 69 is opened momentarily causing relay $R_b$ to drop-out and closing the circuit through relay $R_d$ which, in turn, energizes the motor 32. The motor 32 raises platen 25, advances film F to position an unexposed section under surface 82, momentarily opens switch 97, and opens platen switch 101 dropping out the relay $R_d$ and thereby stopping motor 32. As the platen is raised from the film F, the vacuum is broken at surface 82 of the platen, switch 95 opens, relay 71 drops out and mirror motor 64 stops. In order to trip relay $R_a$, the card C must be removed from throat 35 to discharge capacitor 103 thereby conditioning the trip relay circuit for the next cycle. While not specifically shown and described it is possible by adding simple circuitry including a counter, to make the apparatus repeat for any selected number of cycles (thereby making a plurality of identical exposures).

It will now be apparent to those skilled in that art that a contact printing apparatus has been disclosed which does not require a glass platen on which to rest the negative and print material during exposure thereby eliminating the difficulties attendant on such glass platens, which holds the negative and print material in close printing contact on a novel vacuum platen, and which has a vertically arranged stationary exposure lamp, but includes means for moving light from the lamp in scanning relation to the exposure station for print exposure. It will further be recognized that the problem of dust, lint, etc. in the exposure projection system is substantially reduced or eliminated by the present apparatus.

The invention has been described in detail with particular reference to preferred embodiments thereof, but it will be understood that variations and modifications can be effected within the spirit and scope of the invention as described hereinabove and as defined in the appended claims.

Having now particularly described my invention what I desire to secure by Letters Patent of the United States and what I claim is:

1. In photographic printing apparatus having:
    (a) a station to which light is directed for print exposure;
    (b) a source of illumination spaced from and fixed in position relative to said station; and
    (c) wall means disposed between said source and said station and having an opening through which light from said source passes as it traverses a predetermined path between said source and said station;
the improvement which comprises, varying deflector means disposed in said path between said opening and said station for directing light from said source to said station in scanning relation thereto.

2. The improvement in accordance with claim 1 and wherein said varying deflector means comprises:
    (a) means forming the light from said source into a sheet which is sufficiently wide to extend transversely across said station and across a longitudinal increment only thereof, and (b) means for moving said sheet of light longitudinally of said station during scanning thereof.

3. The improvement in accordance with claim 2 and wherein:

(a) said means forming the light into a sheet comprises a rotatably mounted mirror having at least one rotational position in which the light is directed other than to said station, and (b) said means for moving said sheet of light comprises drive means for rotating said mirror.

4. A photographic apparatus having a station for receiving a photo-sensitive material and an image-bearing member in surface contact with said material, comprising:

(a) means for supporting said material and member in superposed printing relation in said station;

(b) a fixed source of illumination spaced from said station;

(c) wall means between said source and station for defining a path for light from said source to illuminate the member in said station;

(d) means for selectively opening and closing said path to the light from said source; and (e) a varying deflector disposed in said path for scanning the member in said station with the light from said source when said path is open;

(f) whereby the image on said member is exposed onto said material.

5. A photographic apparatus in accordance with claim 4 and wherein said varying deflector comprises:

(a) a light reflecting surface which is mounted for continuous movement between at least a first position in which light from said source is directed to said receiving means and a second position at which said path is closed and light from said source is prevented from illuminating said receiving means.

6. A photographic apparatus in accordance with claim 5 and wherein:

(a) the movement of said reflecting surface is about an axis which is parallel to the plane of said receiving means, and (b) said reflecting surface is rotated through one revolution during print exposure to affect scanning of said receiving means.

7. A photographic printing apparatus for recording on film photographic copies of discrete transilluminated image-bearing members, comprising:

(a) an exposure station, (b) means for supporting one of said members in said station, (c) a platen having a surface for positioning a section of said film in said station in superposed relation to said one member, (d) a source of vacuum pressure, (e) means responsive to the movement of a member into said station for applying said source of pressure to said surface of said platen whereby said one member and said section are held in printing contact in said station by the vacuum pressure, (f) a light source spaced from said station, (g) wall means between said light source and said station for defining a path for light from said light source to illuminate said one member in said station, (h) means disposed in said path for sequentially directing light from said source to said one member in said station in scanning relation thereto and closing said path so that light from said source does not reach said one member in said station, (i) said means last-mentioned being actuated to scan said one member with light in response to a predetermined vacuum pressure at said surface of said platen.

8. A printing apparatus in accordance with claim 7 and wherein said light directing and path closing means comprises:

(a) a reflector which is mounted for rotation about an axis which is parallel to said surface, and (b) means for rotating said reflector one revolution during which said reflector moves to at least two distinct positions, in one of which the reflector directs light to said one member and in another of which said reflector closes said path.

9. A printing apparatus in accordance with claim 8 and wherein:

(a) successive sections of said film are positioned in said station and said apparatus further comprises (b) means operatively associated with said rotating means for moving the then successive section of said film into said station while said reflector is in said another position.

References Cited in the file of this patent
UNITED STATES PATENTS

| | | |
|---|---|---|
| 2,032,485 | Koppe | Mar. 3, 1936 |
| 2,353,512 | Simmon | July 11, 1944 |
| 2,437,229 | Mears | Mar. 2, 1948 |
| 2,842,025 | Craig | July 8, 1958 |
| 2,919,635 | Levine | Jan. 5, 1960 |
| 2,929,309 | Young | Mar. 22, 1960 |